Figure 4:
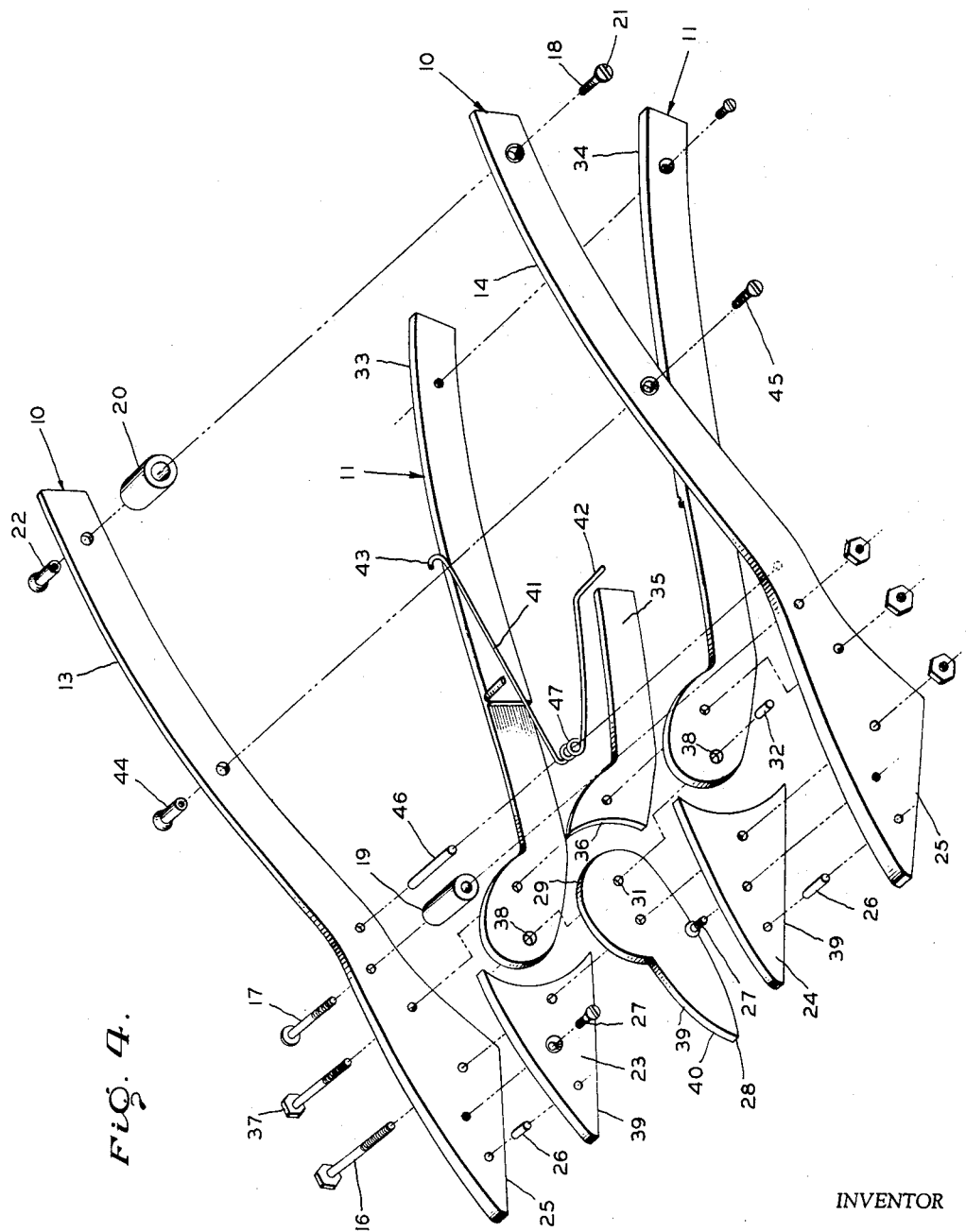

Dec. 25, 1956    J. WILSON    2,775,033
SHEET METAL SHEARS
Filed July 21, 1954    2 Sheets-Sheet 1
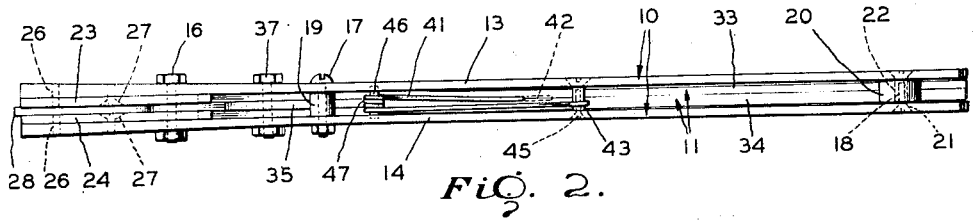
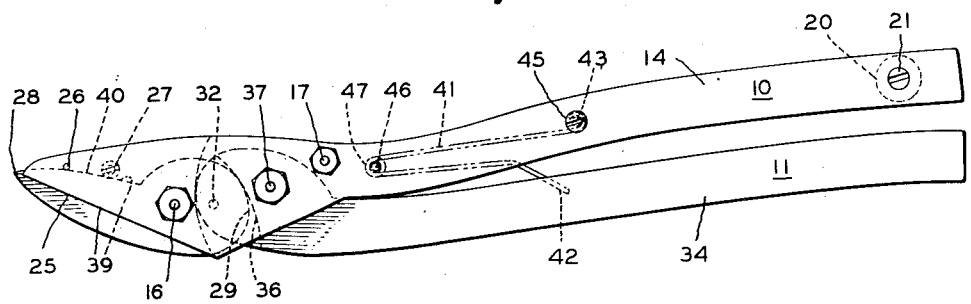
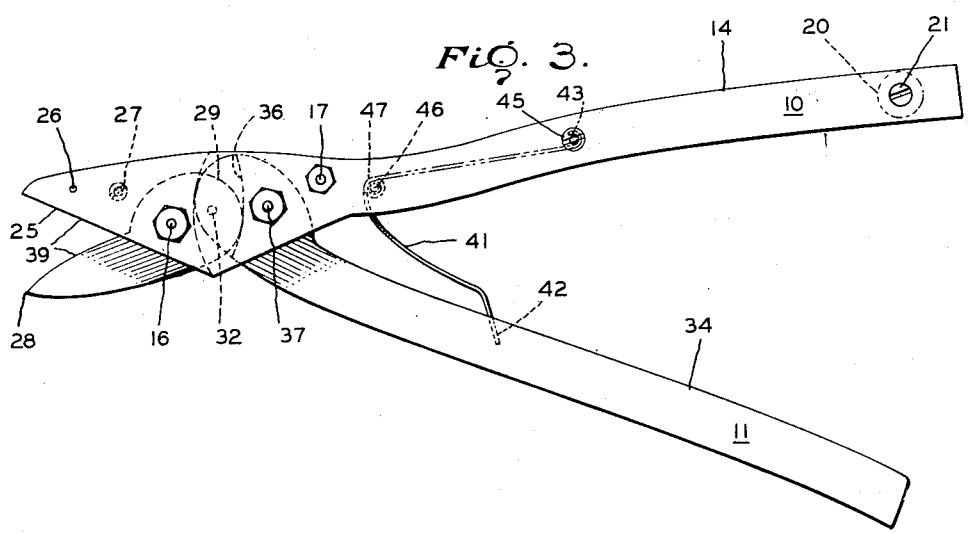
INVENTOR
*Jim Wilson*
BY
*Gustave Miller*,
ATTORNEY Dec. 25, 1956

J. WILSON 2,775,033

SHEET METAL SHEARS

Filed July 21, 1954

2 Sheets-Sheet 2

INVENTOR
*Jim Wilson*

BY
*Gustav Miller*
ATTORNEY.

United States Patent Office 2,775,033
Patented Dec. 25, 1956

2,775,033

SHEET METAL SHEARS

Jim Wilson, West Palm Beach, Fla.

Application July 21, 1954, Serial No. 444,835

2 Claims. (Cl. 30—250)

The present invention relates generally to metal working tools and specifically to a pair of snips or shears for sheet metal.

Numerous styles and designs of shears are available to the tinsmith and sheet metal worker, and some of the shears have special cutting edges for particular purposes. Mechanics working with cylindrical objects such as stove pipes, furnace pipes and the like, have shears which are intended to cut holes either in a left or a right handed circle. Other mechanics, working with flat surface but closed bodies are in need of a tool which will cut straight or in circles with only one blade of the tool within the body.

The present invention, briefly described, is one of the latter and is believed to be an improvement over those shears which are now in use for such purposes, and provides a single tool which will cut flat surfaces and curved surfaces readily, and in straight lines.

A difficulty nearly always experienced in sheet metal severing is the fact that the cut edges cannot, obviously, be moved away from each other and still be on a single plane. Therefore, all shears, heretofore, have means for guiding one edge of the severed sheet either upwardly or downwardly so that the shears can pass between the edges as severed.

The principal object of the present invention is to provide a device for cutting sheet metal in which the severed edges are retained in a single plane.

Another object of the present invention is to provide a device for cutting sheet metal which removes a single thin strip so that the severed edges are spaced apart after severing.

A further object of the present invention is to provide a device for cutting sheet metal in which only the blade need be on one side of a sheet metal body for effective action.

Yet another object of the present invention is to provide a device for cutting sheet metal in which the handles are fulcrumed together and have a power factor in the spacing of the fulcrum of one handle with respect to the cutting blade whereby the power of the handle is multiplied.

These and other objects and advantages of the present invention will be more fully apparent from the following description when considered in connection with the annexed drawings, in which:

Figure 1 is a side view in elevation of the present invention in closed condition, Figure 2 is a top plan view of the present invention, Figure 3 is a side view in elevation of the shears in open condition, and Figure 4 is an exploded perspective view of the present invention showing the relative disposition of its many parts.

Referring more particularly to the drawing, in which like numerals indicate like parts throughout the several views, the present invention is seen to consist of a first handle member 10 pivotally secured to a second handle member 11 adjacent one end of each. The first handle member 10 is composed of a pair of identically shaped, elongated, flattened bars 13 and 14 secured together by bolts 16, 17, and 18, as seen in Figures 2 and 4 the latter two of which have spacers 19 and 20, respectively, and bolt 18 is provided with a countersunk head 21 and similar shank type of nut 22 in order that the handle member 10 be smooth to the grip.

The first handle member 10 has its bars 13 and 14 disposed in spaced apart face to face relation, and at the one end has a pair of fixed blades 23 and 24 secured on the confronting faces of said bars 13 and 14 where they are widened and each provided with a straight foot edge 25. A pin 26 positions each fixed blade to its bar near the nose while counter screws 27 also serve to secure the blade in place.

A cutting blade 28 is pivotally secured between the fixed blades 23 and 24 and is pivoted on the bolt 16, and at its end remote from the point of pivotal connection is provided with a convex end edge 29 and a hole 31 in which is received an operating pin 32.

The other handle member 11 is also composed of a pair of identical elongated bars 33 and 34 which at the handle end are in confronting face to face relation but at the operating end are separated by a spacer member 35 of the same thickness as the cutting blade and which is provided with a concave end face 36 in which a convex end edge 29 of the spacer member 35 slides as the cutting blade pivots on bolt 16. The bars 33 and 34 pivot with respect to bars 13 and 14 on bolt 37 and are each provided with a loosely fitting hole 38 which may even be oval or elongated in shape for the operating pin 32 which is located at a point closer to the one end of each of the bars than the point of pivotal attachment to the bars 13 and 14. This enables the butting blade 28 to be moved to closed position when the bars 33 and 34 are moved towards bars 13 and 14 in closing movement, although no scissors action is produced, the bars 33 and 34 and the cutting blade 28 both being on the same side of the tool.

The cutting blade 28 and the fixed blades 23 and 24 are provided with squared across shearing faces or edges 39 which serve to sever a strip of metal of the same thickness as said cutting blade, the severed strip curling upwardly from the rounded nose surface 40 while the severed edges of the body of sheet metal being cut remain in place and in the same plane, although separated by the thickness of the cutting blade and severed strip.

A spring 41 has a bent one end 42 which fits between the bars 33 and 34 immediately adjacent to the end of the spacer member 35, and has its other end 43 curved to fit over the shank nut 44 and bolt 45 where it is held to hold the handle members apart, as is conventional in shears and scissors. A pin 46 secures the coil 47 of the spring.

While only a single embodiment of the present invention has been here shown and described, other embodiments are contemplated and many changes and modifications of the present embodiments may be made and practiced within the scope of the appended claims without departing from the spirit of the invention.

Having thus set forth and disclosed the nature of this invention, what is claimed is:

1. A sheet metal shears comprising a first handle member being formed of a pair of identically shaped elongated, flattened bars secured together in spaced face to face relation to each other, a second handle member being formed of a pair of similarly shaped elongated flattened bars secured together at one end and in confronting face to face relation to each other, and at the other in spaced face to face relation and pivotally secured adjacent one end to said first handle member adjacent said one end, a cutting blade pivotally connected between the confronting faces of each of said pair of fixed blades, a spacer member secured between said second-named pair of bars fastened to the other end thereof and being provided with a concave end face, said cutting blade being formed with a convex end edge adapted to slide to said concave end face, an operating pin connecting said second handle member to said cutting blade for movement thereof between open and closed positions, said operating pin being disposed on said second handle member at a point closer to said one end thereof than the point of pivotal attachment of said handle member to said first handle member and connecting with said cutting blade at a point thereon further from said one end than its pivotal connection with said pair of fixed blades.

2. A sheet metal shears comprising a first handle member being formed of a pair of identically shaped elongated, flattened bars secured together in spaced face to face relation to each other, a pair of fixed blades secured one to each said bars in spaced face to face relation to one another and on the confronting face and adjacent one end thereof, a cutting blade pivotally secured at its center between said pair of fixed blades and being movable at one end from open to closed position, a second handle member being formed of a pair of similarly shaped elongated flattened bars secured together at one end in confronting face to face relation to each other and at the other in spaced face to face relation, said second-named pair of bars being positioned between said first named pair of bars and being pivotally connected adjacent said other end thereto, a spacer member secured between said second-named pair of bars adjacent said other end thereof and being provided with a concave end face, said cutting blade being formed with a convex end edge adapted to slide on said concave end face, an operating pin connecting said second named pair of bars with said cutting blade for movement therewith between open and closed positions, said cutting blade and said pair of fixed blades having coacting shearing edges adapted and arranged to shear sheet metal with both of said pairs of handle members on one side thereof.

References Cited in the file of this patent
UNITED STATES PATENTS

| | | |
|---|---|---|
| 50,497 | Ries | Oct. 17, 1865 |
| 97,874 | Butter et al. | Dec. 14, 1869 |
| 552,364 | Glunt | Dec. 31, 1895 |
| 766,298 | Voellner et al. | Aug. 2, 1904 |

FOREIGN PATENTS

| | | |
|---|---|---|
| 544,590 | Great Britain | Apr. 20, 1942 |